US011192238B2

(12) United States Patent
Schreiner et al.

(10) Patent No.: US 11,192,238 B2
(45) Date of Patent: Dec. 7, 2021

(54) DEVICE FOR HANDLING OBJECTS

(71) Applicant: Eisenmann SE, Boeblingen (DE)

(72) Inventors: Thomas Schreiner, Dettenhausen (DE); Stephan Schwab, Waldenbuch (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 0 days.

(21) Appl. No.: 15/552,899

(22) PCT Filed: Feb. 16, 2016

(86) PCT No.: PCT/EP2016/000260
§ 371 (c)(1),
(2) Date: Aug. 23, 2017

(87) PCT Pub. No.: WO2016/134831
PCT Pub. Date: Sep. 1, 2016

(65) Prior Publication Data
US 2018/0178373 A1 Jun. 28, 2018

(30) Foreign Application Priority Data
Feb. 23, 2015 (DE) ............ 10 2015 002 090.0

(51) Int. Cl.
*B25J 9/00* (2006.01)
*B05C 15/00* (2006.01)
(Continued)

(52) U.S. Cl.
CPC ......... *B25J 9/0009* (2013.01); *B05B 13/0452* (2013.01); *B05B 16/40* (2018.02);
(Continued)

(58) Field of Classification Search
CPC ...... B25J 9/0009; B25J 9/0093; B25J 9/0027; B25J 11/0075; B25J 9/00; B25J 13/00;
(Continued)

(56) References Cited

U.S. PATENT DOCUMENTS 4,714,044 A * 12/1987 Kikuchi ............ B05B 13/0452
118/314
5,286,160 A * 2/1994 Akeel ............... B05B 13/0292
118/326
(Continued)

FOREIGN PATENT DOCUMENTS

| CA | 2 129 680 A1 | 5/1994 |
| CN | 11 40 645 | 1/1997 |

(Continued)

OTHER PUBLICATIONS

English Machine Translation of DE102012019958 (A1), Inventor—Eckhard Reese, published Apr. 11, 2013.*
(Continued)

*Primary Examiner* — Laura Edwards
(74) *Attorney, Agent, or Firm* — Schroeder Intellectual Property Law Group, LLC

(57) ABSTRACT

A positioning apparatus for a handling robot, wherein the positioning apparatus is designed to keep the handling robot in an idle position in a first state of the positioning apparatus, and to keep the handling robot in an active position in a second state, wherein, in the idle position, the handling robot is arranged below an object to be handled. The invention further relates to a device for handling objects, comprising a conveying apparatus for moving the objects to be handled and a positioning apparatus.

16 Claims, 10 Drawing Sheets

(51) Int. Cl.
  *B05B 16/40* (2018.01)
  *B05B 13/04* (2006.01)
  *B25J 11/00* (2006.01)
  *B05B 16/00* (2018.01)

(52) U.S. Cl.
  CPC .............. B05C 15/00 (2013.01); B25J 9/0093 (2013.01); B25J 11/0075 (2013.01); *B05B 16/90* (2018.02); *Y10S 901/43* (2013.01)

(58) Field of Classification Search
  CPC ........... B05B 13/0452; B05B 13/0431; B05B 13/0447; B05B 15/12; B05B 16/00; B05B 16/40; B05B 16/90; Y10S 901/43; B05C 5/0208; B05C 15/00; B65H 2301/5162; B65H 2401/13; B65H 2406/21
  USPC ........ 118/300, 323, 326; 198/312, 313, 581; 901/43, 1; 414/555; 700/245, 123, 302
  See application file for complete search history.

(56) References Cited

U.S. PATENT DOCUMENTS

| | | | |
|---|---|---|---|
| 5,490,646 A * | 2/1996 | Shaw | B25J 5/005 244/134 C |
| 5,596,945 A | 1/1997 | Van Der Lely | |
| 5,989,643 A * | 11/1999 | Nakagawa | B05B 13/0452 118/313 |
| 8,393,362 B1 * | 3/2013 | Hollerback | B67D 7/0401 141/192 |
| 9,623,432 B2 | 4/2017 | Schmidt | |
| 2009/0204260 A1 | 8/2009 | Bryne et al. | |
| 2010/0300490 A1 * | 12/2010 | Axelsson | A01J 7/025 134/23 |
| 2013/0071573 A1 | 3/2013 | Brewer et al. | |
| 2018/0326507 A1 | 11/2018 | Halvorsen et al. | |

FOREIGN PATENT DOCUMENTS

| | | |
|---|---|---|
| CN | 1 788 859 | 6/2006 |
| CN | 103 476 512 | 12/2013 |
| DE | 693 29 490 T2 | 5/2001 |
| DE | 102005036342 * | 3/2006 |
| DE | 10 2012 019 958 A1 | 4/2013 |
| DE | 10 2011 120 230 A1 | 6/2013 |
| EP | 2 599 559 A1 | 6/2013 |
| EP | 3 212 363 | 9/2017 |
| GB | 2 180 173 A | 3/1987 |
| JP | 6-226156 * | 8/1994 |
| WO | 2005/046880 A2 | 5/2005 |
| WO | 2009/146936 A1 | 12/2009 |
| WO | 2016/066615 | 5/2016 |

OTHER PUBLICATIONS

Office Action in related CN App. No. 201680011412.2 dated Apr. 2, 2020, 12 pages.

* cited by examiner

DEVICE FOR HANDLING OBJECTS

RELATED APPLICATIONS

This application is a national phase of International Patent Application No. PCT/EP2016/000260 filed Feb. 16, 2016, which claims the filing benefit of German Patent Application No. 10 2015 002 090.0 filed Feb. 23, 2015, the contents of both of which are incorporated herein by reference.

FIELD OF THE INVENTION

The invention relates to a positioning device for a robot for treating an object and to an apparatus for treating objects.

BACKGROUND OF THE INVENTION

In the field of application technology, in particular the surface treatment and coating of objects, cycle speed, in addition to the assurance of high quality and the lowering of unit costs, plays a critical role. In the application of paint, for instance, the object to be painted, for instance a vehicle body, is conveyed through a painting booth by means of materials-handling technology. Here, either a stop-and-go process or a continuous conveyance of the object to be treated, with the aid of suitable conveying devices, are employed as the modes of conveyance. In the case of the stop-and-go process, the object to be painted is moved into the painting booth and remains stationary during the treatment operation or the painting operation. In the case of continuous conveyance, the object to be painted moves during the painting operation at a continuous speed through the painting booth.

In both cases, multi-axis robots which bear a coating device are nowadays employed to treat the object. Since vehicle bodies to be painted generally have doors, as well as a tailgate and an engine hood, the coating device can reach the interior of the body only when the door, as well as the tailgate and the engine hood, are open or raised. For these opening and closing operations, so-called handling robots are employed. A handling robot of this kind opens a door, for instance, and holds it in the open state, while a multi-axis robot, with the coating device, paints the interior of the body, which interior is reachable from the open door. After the painting operation, the handling robot can reclose the door insofar as this is necessary for the further treatment of the body. During the painting or coating operation, in particular, however, after the closure of the vehicle body apertures for the external painting or coating, the movement space of the multi-axis robot is restricted by the presence of the handling robot. Added to this, furthermore, is the fact that, during the treatment of the object to be treated, such as, for instance, the vehicle body, it may be necessary to move the employed multi-axis robot, relative to the object to be treated, along a horizontal or vertical additional axis in order to reach all the surfaces of the object which are to be treated. Here too, the presence of the handling robot can be an impediment.

For this reason, a two-stage treatment of the vehicle body in the painting or treatment booth is usually provided in order firstly in a first step, for instance, to paint or treat the interior of the vehicle body, and subsequently, in a second step, to paint or treat the vehicle body from outside. This means that in the painting plant two regions have to be provided in order to be able to fully paint a vehicle body. For both regions, respectively a plurality of multi-axis robots, which respectively bear a coating device, have respectively to be provided. This means that a multiplicity of almost identical multi-axis robots, respectively bearing a coating device, have to be installed in the painting plant. Added to this is the fact, for each multi-axis robot, respectively bearing a coating device, the necessary connections to the supply lines for paint, detergent, current and compressed air have to be provided.

In FIGS. 1 and 2, this situation is represented. In FIGS. 1 and 2 is represented a painting booth 1 with internal and external painting region, which painting booth operates according to the stop-and-go process.

Vehicle bodies 2 are conveyed through the vehicle cabin 1. Multi-axis robots 3, respectively bearing a coating device, are provided on an interior painting station 4 and an external painting station 5. The multi-axis robots 3 can move relative to the body 2. Multi-axis robots without horizontal or vertical additional movement axis are represented. On the internal painting station 4, handling robots 6 are additionally fixedly provided. As a rule, such handling robots 6 are provided in the immediate vicinity of the element to be opened/closed, i.e. here a door of the vehicle body 2, and thus, as a result of the spatial volume occupied by the handling robot 6, restrict the freedom of movement of the multi-axis robots 3. Due to the need to provide two painting regions 4, 5 for the internal and the external region of the vehicle body 2, this painting booth possesses the drawbacks described above.

It is known to provide for the handling robots 6 a relative mobility to the vehicle body 2, which relative mobility is comparable to the multi-axis robots 3. In WO 2009/146936 is described a painting booth of this kind, in which the internal, and parts of the external painting, are performed simultaneously, and the external painting is concluded after a closure of the body apertures. This solution is complex, however, and thus expensive.

SUMMARY OF THE INVENTION

An object of the invention is to alleviate said drawbacks and, in particular, to define an apparatus which restricts the movement space of a multi-axis robot, bearing a coating device, as little as possible. In particular, it is additionally an object of the invention to enable the internal and the external painting of an object, in particular a vehicle body, with the same multi-axis robots bearing a coating device.

This object may be achieved by positioning a device for a handling robot for treating an object, wherein the positioning device is set up to, in a first state of the positioning device, hold the handling robot in a rest position and, in a second state, hold the handling robot in an active position, wherein the handling robot, in the rest position, is disposed beneath an object to be treated.

Further embodiments of the invention are defined in the subclaims.

The positioning device according to the invention for a handling robot is set up to, in a first state of the positioning device, hold a handling robot in a rest position and, in a second state, in an active position. In the rest position, the handling robot is disposed beneath, in particular within a vertical projection of, an object to be treated. For the handling robot, two positions into which it can be brought by means of the positioning device are thus provided. In the active position, it is provided that it can fulfill its actual intended purpose, namely the treatment of an object. In the rest position, on the other hand, it is provided that it is preferably located beneath the object to be treated.

Because the positioning device has to bring the handling robot substantially only into two positions, the positioning device has to satisfy lower requirements than if an accurate positioning would have to be realized along a travel path. The possibly necessary accurate positioning of the handling robot, for example at a window aperture of a vehicle door, is effected by the handling robot itself. Furthermore, the storage of the handling robot beneath the object to be treated is particularly advantageous, since, in this way, the entire space to the side of the object to be treated, and/or above this same, remains free. If the handling robot is disposed in its rest setting, in particular within a vertical projection of the object to be treated, then, moreover, the entire space to the side of the object to be treated is free, for instance, for treatment by multi-axis robots, respectively bearing a coating device.

A preferred initial form is obtained by virtue of the fact that the handling robot, in the active position, is at least partially above the lowest point of the object to be treated. While the handling robot thus, in the rest setting, offers free access to the object to be treated, it is arranged, in the active position, in such a way relative to the object to be treated that it can perform, for instance, an action on the object to be treated, such as, for example, the opening of a door.

Preferably, the positioning device has a mechanical connection facility for the handling robot. The positioning device can thus be equipped, according to requirement, with a suitable handling robot. The handling robot can preferably also be constituted by a robot having a plurality of axes, which robot can be fitted at its free end with various implements for opening and/or closing doors on a vehicle.

It is particularly preferred if the position of the mechanical connection facility in the rest position differs from the position of the mechanical connection facility in the active position. In a changeover from the rest position into the active position, a displacement of the mechanical connection facility thus occurs. In this way, the movement space which in the active position is occupied by the handling robot can be at least partially, preferredly fully, vacated through a displacement of the handling robot into the rest position.

It is of advantage if the positioning device is set up such that a changeover from the rest position into the active position is realized by means of a rotational movement and/or a translational movement. Depending on the design of the handling robot or of the positioning device, the one or the other type of movement, or a combination of rotation and translation, can be of advantage.

Advantageously, the handling robot, in the rest position, is protected by the positioning device. The protection can here relate, in particular, to gases, liquids or solids found in the vicinity of the positioning device, in particular to overspray in a painting operation.

A preferred embodiment of the invention is an apparatus for treating objects, comprising a conveying device for moving the object to be treated and a positioning device as described above. A positioning device of this type can advantageously be integrated into the space of the conveying device without impeding this. Such an apparatus for treating objects can be constituted, for instance, by a painting booth.

If such an apparatus for treating objects, in particular a painting booth, is equipped with a positioning device which provides for a displacement of the mechanical connection facility of the handling robot during a changeover from the rest position into the active position, it is of advantage if a straight connecting line between the mechanical connection facility in the rest position and the mechanical connection facility in the active position has an angle to the motional direction of the object to be treated within a range from 30° to 150°, preferredly 45° to 135°, particularly preferredly 60° to 120°, and in particular 90°. If a displacement of the handling robot takes place perpendicular to the motional direction, defined by the conveying device, of the object to be treated, or substantially perpendicular thereto, the handling robot must cover only a short path in order to get from the rest position into the active position.

It is of advantage if the positioning device is disposed on, and/or within the space containing, the conveying device. The positioning device can be positioned, for instance, at a fixed point in the region of the conveying device such that the handling robot, in the rest position, is disposed fully beneath the object to be treated.

In one embodiment, it can be provided that the positioning device is set up to be jointly conveyed, together with the object to be treated, by means of the conveying device itself, or beneath the conveying device by means of an own additional horizontal axis. Such an arrangement can in particular be of advantage if the conveying device provides for a continuous movement, in which the object to be treated, during the treatment, is conveyed, i.e. moved, continuously. In a so-called stop-and-go process, on the other hand, it can be of advantage if the positioning device is placed fixedly in the region of or beneath the conveying device and is not jointly conveyed with the object to be treated.

In one design of the apparatus for treating objects, in particular a painting booth, it can be provided that the apparatus has further multi-axis robots, respectively bearing a coating device. Such an apparatus can therefore have at least a first handling robot, which, by means of the positioning device, is movable between an active position and a rest position, and at least a second multi-axis robot. If the at least first handling robot is in its rest position, a greater motional space is available to the at least second multi-axis robot than if the at least first handling robot is in its active position. This design enables the apparatus for treating objects, in particular a painting booth, to have a single combined internal/external painting region.

In one embodiment of the apparatus, while the at least one handling robot is held in an active position by the at least one positioning device, the object, preferably the vehicle body, is painted from inside, with doors, tailgate and/or front hood open, by the at least one multi-axis robot bearing a coating device.

Alternatively or additionally, it can be provided that, in one embodiment of the apparatus, while the at least one handling robot is held in a rest position by the at least one positioning device, the object, preferably the vehicle, is painted from outside, with doors, tailgate and/or front hood closed, by the at least one multi-axis robot bearing a coating device.

In one embodiment of the apparatus, in dependence on the state of the positioning device of the at least one handling robot, the at least one multi-axis robot is set by the control system of the apparatus for treating objects, in particular a painting booth, such that its parameters enable a spray jet form appropriate to the state of the positioning device.

Due to the different requirements for the handling robot and the multi-axis robot, these can be structured differently.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention will now be explained in greater detail with reference to the figures, wherein.

DETAILED DESCRIPTION OF THE PRESENT INVENTION

Figure 1:
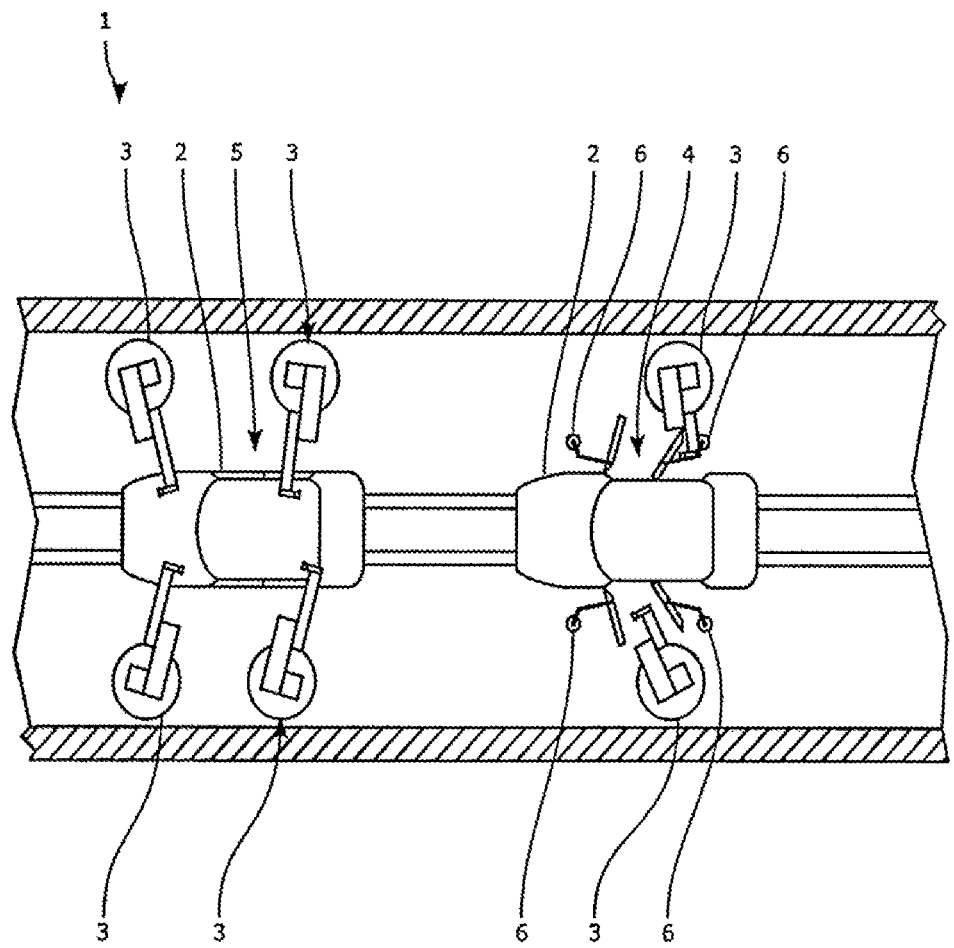
FIG. 1 shows a top view of a painting booth according to the prior art.
Figure 2:
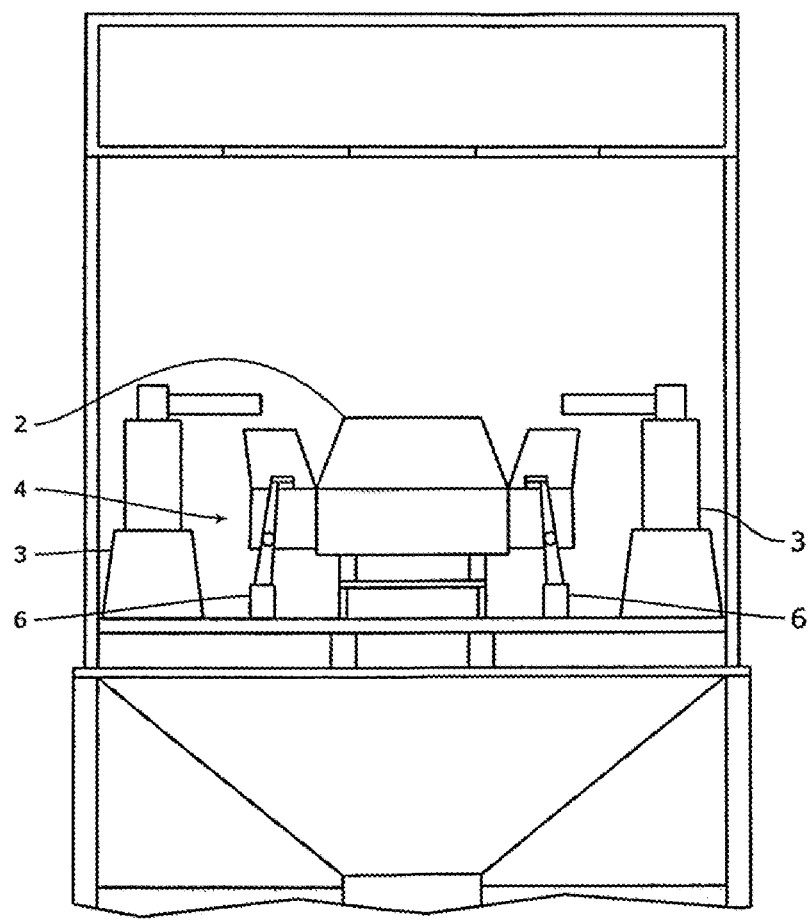
FIG. 2 shows a sectional view of the painting booth of FIG. 1.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 3:
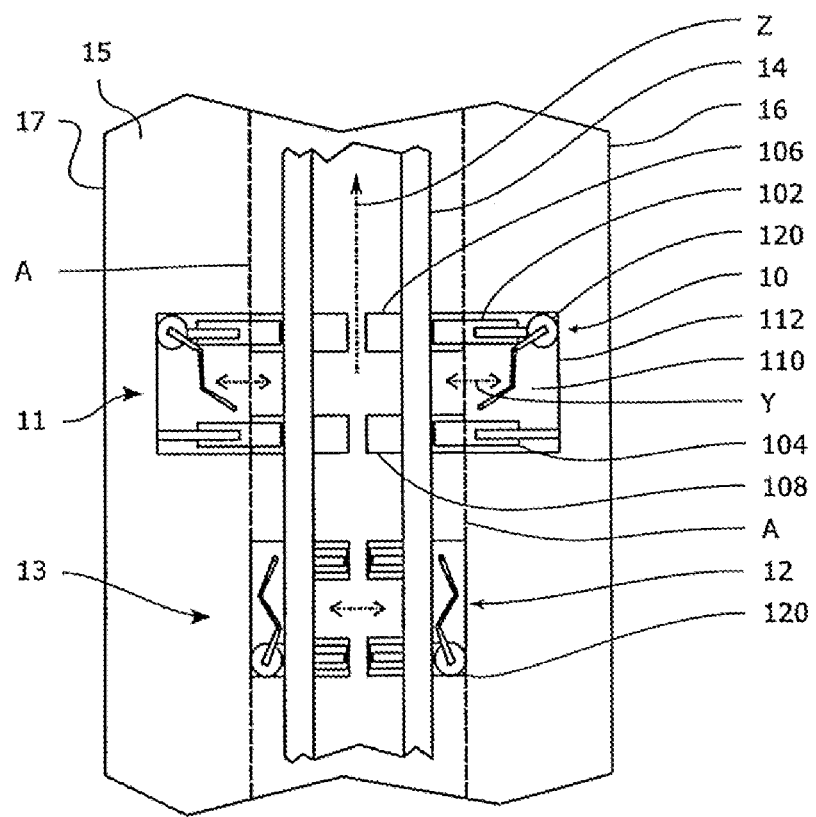
FIG. 3 shows a top view of a first inventive embodiment of a positioning device, without multi-axis robots which bear a coating device.

In FIG. 3, four positioning devices 10, 11, 12, 13 according to a first embodiment are shown in a top view. The positioning devices 10-13 are integrated into the space of a conveying device 14. The conveying device 14 is set up to move objects to be treated, such as, for example, vehicle bodies, along a conveying axis Z through a treatment space, such as, for example, a painting booth 15. The painting booth 15 is shown merely schematically and in a selected detail and has along the conveying axis Z walls 16, 17. The additional representation of multi-axis robots for coating tasks has been dispensed with for the sake of clarity.

The painting booth is also bounded in the direction of conveyance Z by walls (not shown here) comprising locks for the objects to be treated. FIG. 3 shows a painting booth, in which both the firstly occurring internal painting and the subsequently following external painting of the object, in particular the vehicle body, is possible. Thus the multi-axis robots (not shown) bear a coating device, which is suitable for use both for the internal coating and for the external coating.

The adaptation of the spray jet of the coating device, as well as further parameters such as paint quantity, guidance air or high tension, are preset by a central control unit (not shown) of the painting booth. This also presets the parameters for the positioning device. The state of the positioning device and the position of the handling robot must fit the parameters for the corresponding painting.

There are preferably two positioning devices 10, 12 on one side of the conveying device 14 and two positioning devices 11, 13 on the other side of the conveying device 14. The positioning devices 10-13 are designed according to the basic principle of a drawer, and open and close along a movement axis Y. The movement axis Y is substantially perpendicular to the conveying axis Z. Other angles, apart from a 90° angle, between movement axis Y and the conveying axis Z are of course possible, as long as the movement along the movement axis Y enables a distancing from the conveying axis Z. The positioning devices 10, 11 disposed further forward along the conveying axis Z are shown in an active position, the positioning devices 12, 13 disposed further back along the conveying axis Z are shown in a rest position. During a painting operation, all positioning devices 10-13 of a painting booth are generally in the same state, i.e. either in the rest position or in the active position. The state shown in FIG. 3 can occur, for instance, during a changeover from internal to external painting.

The individual positioning devices 10-13 are substantially of identical construction. In the following, only the positioning device 10 is therefore described in detail, though the description applies analogously also to the other positioning devices 11-13. The positioning device 10 has two displacement devices 102, 104. The displacement devices 102, 104 can be motor-driven, for instance electromotively, or pneumatically or hydraulically driven. The displacement devices 102, 104 are supported beneath the conveying device 14 on mounting points 106, 108. The displacement devices 102, 104 are mechanically coupled with a platform 110. The platform 110 can be of planar construction, constructed as a frame structure, or otherwise suitably constructed. Upon an actuation of the displacement devices 102, 104, the platform 110 is moved along the movement axis Y out from beneath the conveying device 14. In this first end position denoted as the active position, the positioning device 10 is shown. In a second end position denoted as the rest position, the positioning device 12, for instance, is shown.

The platform 110 bears a handling robot 120. For this purpose, a mechanical connection facility (not presented in detail) is provided on the platform 110. In the present embodiment, the handling robot 120 is constructed as a door-opening robot. The handling robot 120 can also be constituted by a hood-opening or tailgate-opening robot. In sum, each individual positioning device includes two-motor driven or pneumatically or hydraulically driven displacement devices, a platform which is mechanically coupled to the displacement devices, and a mechanical connection facility on each platform for bearing the handling robot.

During the positioning operation into the active position, or at the end of the positioning operation, the handling robot 120 for its part assumes an active setting, in which it can perform its intended function. In order to be moved by the positioning device into the rest position, the handling robot 120 for its part assumes during or before the positioning operation a rest setting. In the case of the positioning device 10, the handling robot 120 is shown in its active setting, while, in the case of the positioning device 12, the handling robot 120 is in the rest setting. If the positioning device 10, as shown for instance, in the case of the positioning device 12, is in its rest position, a cover 112 placed on the platform 110 protects the behind-situated handling robot 120 from overspray generated during the painting operation.

As can likewise be seen on the basis of the positioning devices 12, 13 found in the rest position, the respective positioning device 12, 13 is located fully beneath and/or fully within a region A swept over by the object to be treated, which region is identified in the figures by a dashed line.

Figure 4:
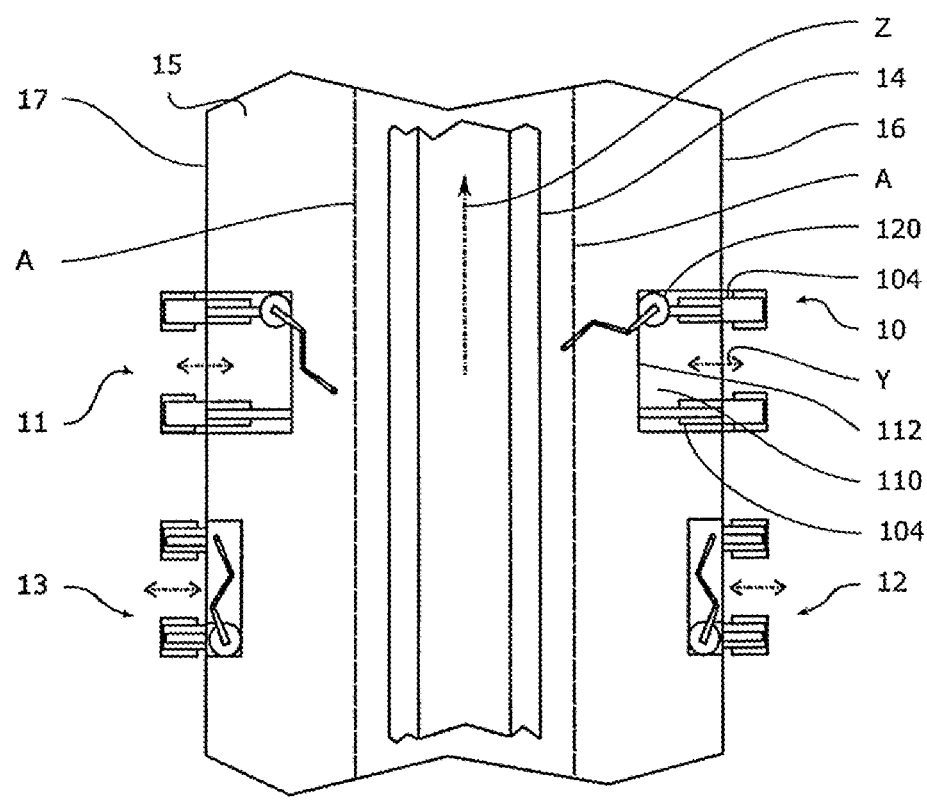
FIG. 4 shows a top view of a second inventive embodiment of a positioning device, without multi-axis robots which bear a coating device.

FIG. 4 shows in a top view a second embodiment of a positioning device. For same or comparable 20 features, the same reference symbols are used in the following. Unlike the positioning devices 10-13 of FIG. 3, in FIG. 4 the positioning devices 10-13 are not disposed beneath the conveying device 14 and within the region A swept over by the object to be treated, but instead, in their rest position, as is shown in the case of the positioning devices 12, 13, are located at least partially in the walls 16, 17. Here too, a complete disappearance of the positioning devices 13 in the walls 16, 17 would be possible. Since, however, the range of movement of a multi-axis robot which moves in the painting booth 15 and bears a coating device is located close to the object to be treated, a complete disappearance of the positioning devices 10-13 is not absolutely necessary.

In the event that the multi-axis robot (not shown), bearing the coating device, can be moved, however, on an additional horizontal axis parallel to the object to be treated, then the positioning device described in FIG. 4 should be accommodated beneath this additional horizontal axis.

Figure 5:
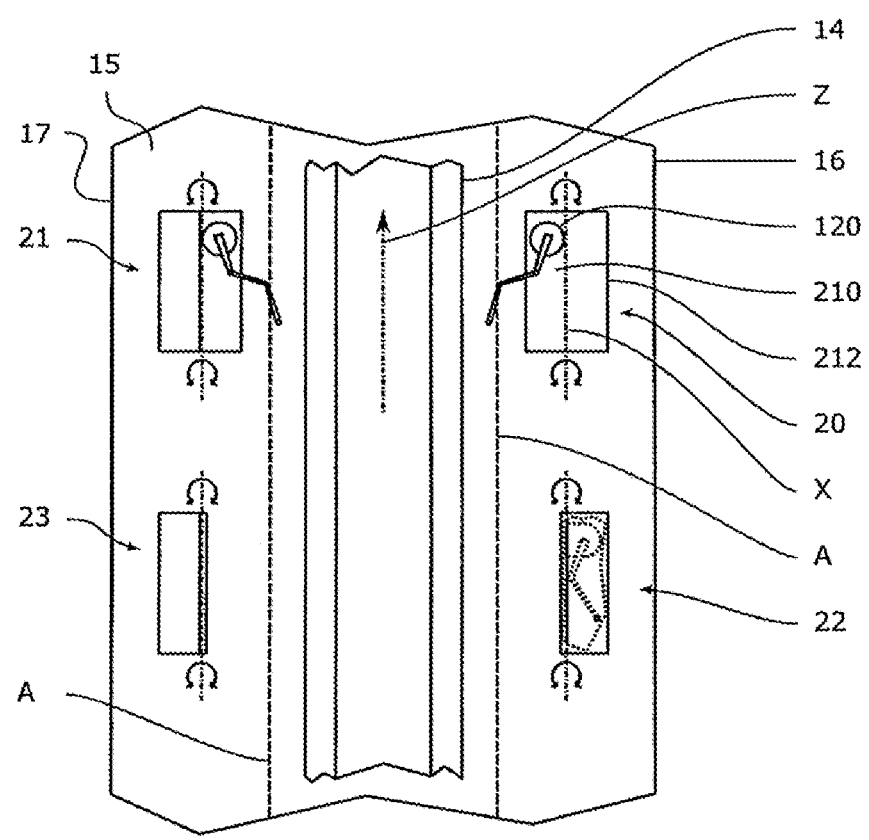
FIG. 5 shows a top view of a third inventive embodiment of a positioning device, without multi-axis robots which bear a coating device.

FIG. 5 shows in a top view a third embodiment of a positioning device. In the painting booth 15 are once again arranged four positioning devices 20, 21, 22, 23. Unlike the first embodiment of FIG. 3, the positioning devices 20-23, in the rest position, are accommodated in the floor of the painting booth 15. The positioning devices 22, 23 arranged at the bottom in FIG. 5 are shown in this rest position, the positioning devices 20, 21 arranged at the top in FIG. 5 are shown in the active position.

The positioning devices 20-23 are pivotable about an axis X. The axis X is arranged parallel to the conveying axis Z. However, this is not a necessary precondition. Any other arrangement at any chosen angle to the conveying axis Z is possible. The positioning devices 20-23 are substantially of identical construction. For this reason, in the following, only the positioning device per se is explained on the basis of the representations of the positioning devices 20, 22. Each of the positioning devices 20-23 has a handling robot 120, which, in the active position (represented on the basis of the positioning devices 20, 21), is movable into an active setting and, in the rest position (represented on the basis of the positioning devices 20, 23), is movable into a rest or parking setting. In the rest setting in the floor, the positioning device 20, 21 is fully removed from the painting booth 15 and is protected with a cover against the substances, such as, for instance, overspray, found in the painting booth. The cover 212 can at the same time be traversed, or the positioning devices 20-23 form no interference contour in the painting booth, so that a multi-axis robot moving in the painting booth 15 and bearing a coating device suffers no restrictions in terms of its range of movement.

In the representation of the positioning device 22, the cover 212 is diagrammatically partially removed, so that it is evident that the handling robot 120, in the rest position, assumes a rest setting. The handling robot 120 is disposed on a platform 210. In a cross section perpendicular to the floor of the painting booth 15, the platform 210 can have an L-shape, but it can also be configured as a simple plate.

Alternatively, the handling robot 120 can be disposed beneath or behind a movable flap in the floor or the wall of the painting booth. The flap, which in the active position of the handling robot is tilted away or pushed away and gives the handling robot its full freedom of movement and which in the rest position conceals the handling robot 120, is the simplest embodiment of the positioning device. This example is not shown in the figures.

Figure 6:
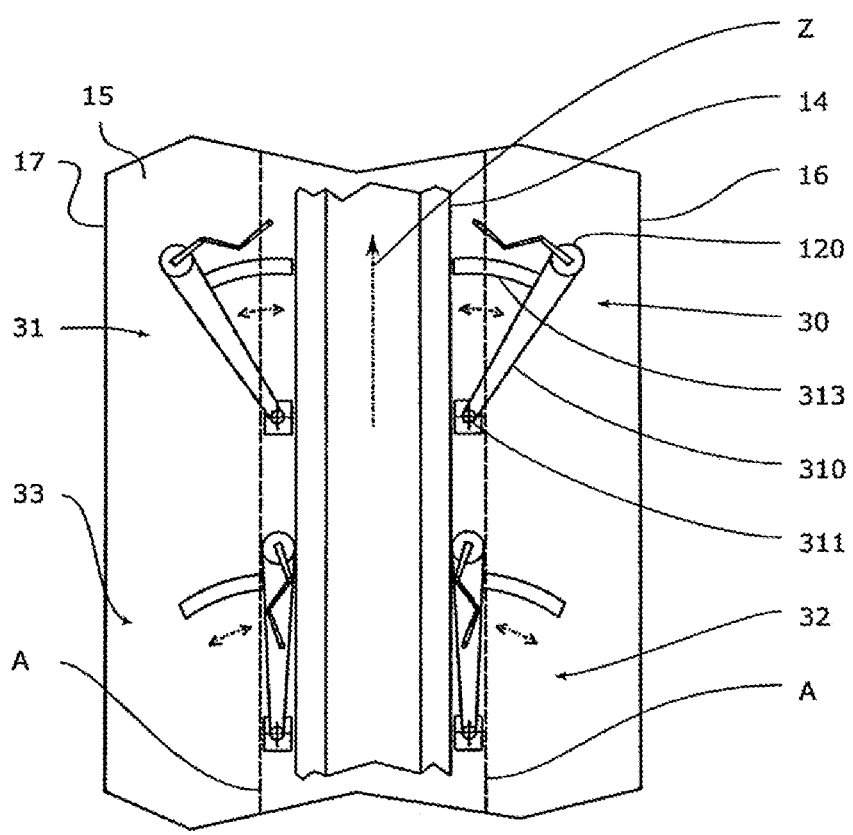
FIG. 6 shows a top view of a fourth inventive embodiment of a positioning device, without multi-axis robots which bear a coating device.

FIG. 6 shows in a top view a fourth embodiment of a positioning device. The positioning devices 30-33 shown in FIG. 6 are substantially structurally identical, except for a mirror-image arrangement. The positioning devices 30-33 have a pivotable platform 310. The platform 310 is articulately attached at one end, beneath the region A swept over by the object to be treated, to a joint 311 fastened, for instance, to the floor of the painting booth 15. That end of the platform 310 which lies opposite the joint 311 bears a handling robot 120. A guide 313, which, if need be, can be equipped with bearings, guides the pivot motion of the platform 310. The force application required for the movement of the positioning device 30 can be realized either in the region of the joint 311 or, for instance, in the region of the guide 313. In the rest position shown in the positioning devices 32, 33, the platform 110, together with handling robot 120, is located within the region A swept over by the object to be treated. Only the guide 313 juts out of the region A. However, the guide can be designed, for instance, such that it has the same level as the surrounding floor of the painting booth and thus can be traversed, for instance, without the presence of a sill. In sum, the positioning devices of the fourth embodiment each include a pivotable platform which is articulately attached to a joint fastened to the floor of the painting booth. A guide which can be equipped with bearings guides the pivot motion of the platform.

FIGS. 7-10 show top views and sectional views of an inventive embodiment of an apparatus for treating objects, which in the present example is configured as a painting booth 15 comprising a single painting station 18. At the painting station 18 are provided four multi-axis robots 3. The multi-axis robots 3 can be configured, for instance, as robots having seven motional axes, in total, so that the individual multi-axis robot 3 can move automatically relative to the fixed object to be treated. By means of a conveying device 14, the objects to be treated, in the present example vehicle bodies 2, are conveyed along a direction of conveyance Z in the stop-and-go process to the painting station 18 and, after the painting operation, onward out of the painting booth 15. The painting station 18 is a combined internal/external painting station. A repositioning of the handling robots from internal to external painting, or vice versa, is conducted by positioning devices so rapidly that the overall cycle time of the painting booth 15 can be increased.

Furthermore, as a result of this amalgamation of the internal paint booth with the external paint booth, up to four multi-axis robots with associated coating devices are omitted. As a result, the painting line can be built shorter in total. Above all some of the supply lines are thus omitted, however, inclusive of the air supply into the painting booth and the overspray cleaning system beneath the painting booth.

In the painting station 18, four positioning devices 10-13, as they have already been explained in detail with reference to FIG. 3, are provided on the conveying device 14 and beneath a region A which is covered by a vehicle body 2.

Figure 7:
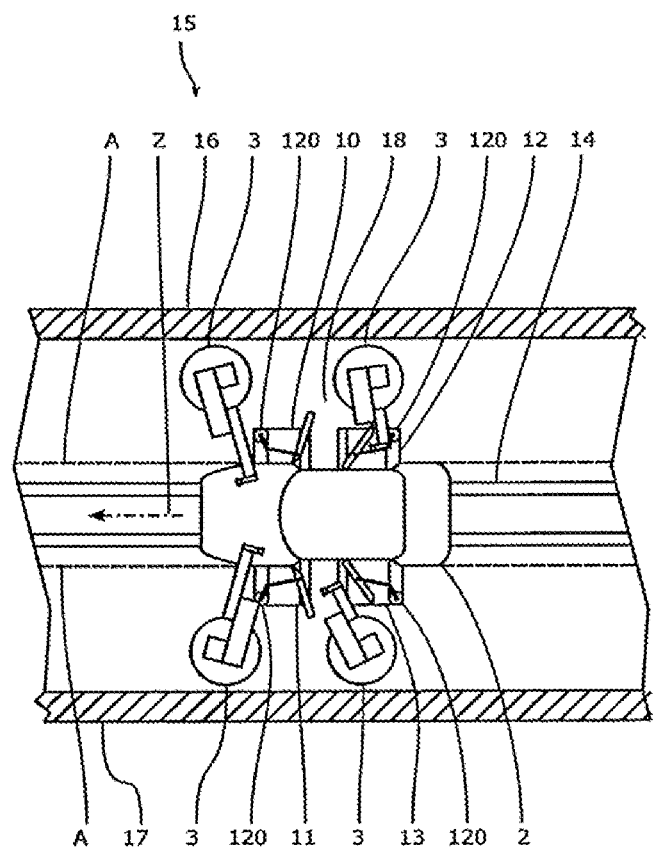
FIG. 7 shows a top view of a painting booth according to the invention, comprising positioning devices, found in the active position, according to FIG. 3.
Figure 8:
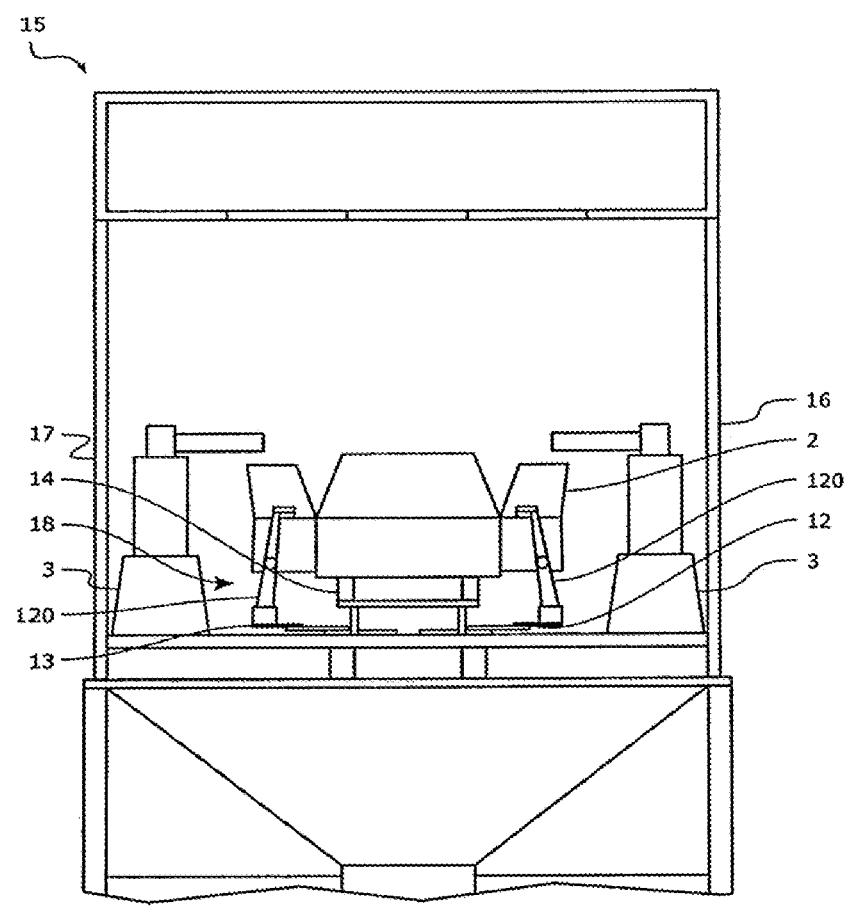
FIG. 8 shows a sectional view of the painting booth of FIG. 7.

In FIGS. 7 and 8, the positioning devices 10-13 are in the active position. The handling robots 120 have assumed their active setting. More specifically, the handling robots 120, which in this embodiment are configured as door-opening robots, hold the respective door of the vehicle body 2 in the open setting. Further similarly designed handling robots can also be provided for a hood opening or tailgate opening. Depending on the design of the door/hood/tailgate opening mechanism, it can also be provided that the handling robot 120 is not required to hold the door/hood/tailgate open. In this case, the positioning device 10-13 can proceed after the opening operation into a rest position, in order thus to give the multi-axis robots 3 a maximum possible freedom of movement. In the present illustrative embodiment, as shown in FIGS. 7 and 8, the vehicle body 2 is initially painted internally, so as then to be painted externally. This is represented in FIGS. 9 and 10.

Figure 9:
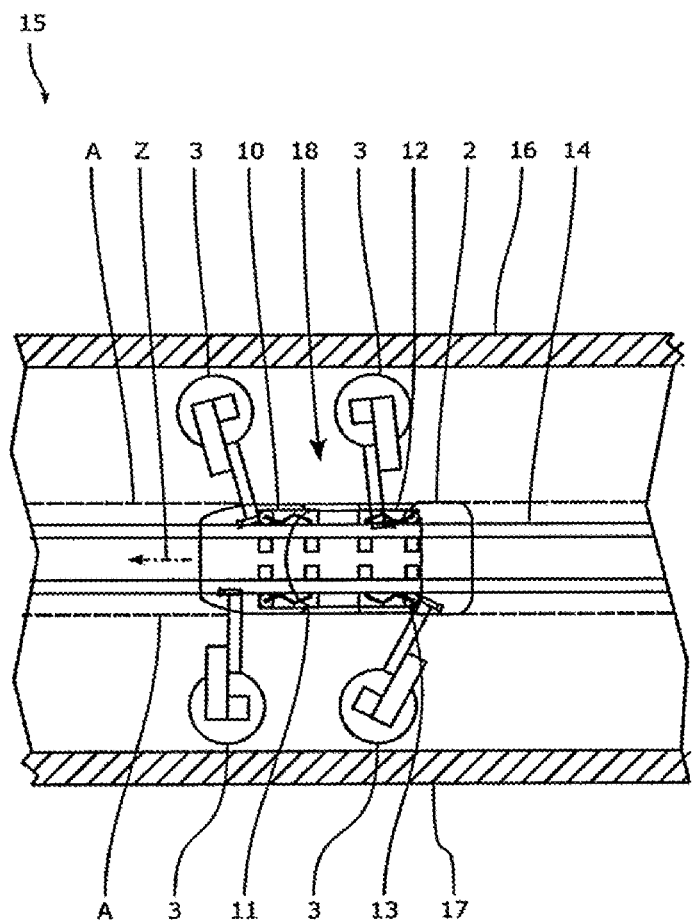
FIG. 9 shows a top view of FIG. 7, with the positioning devices in the rest position.
Figure 10:
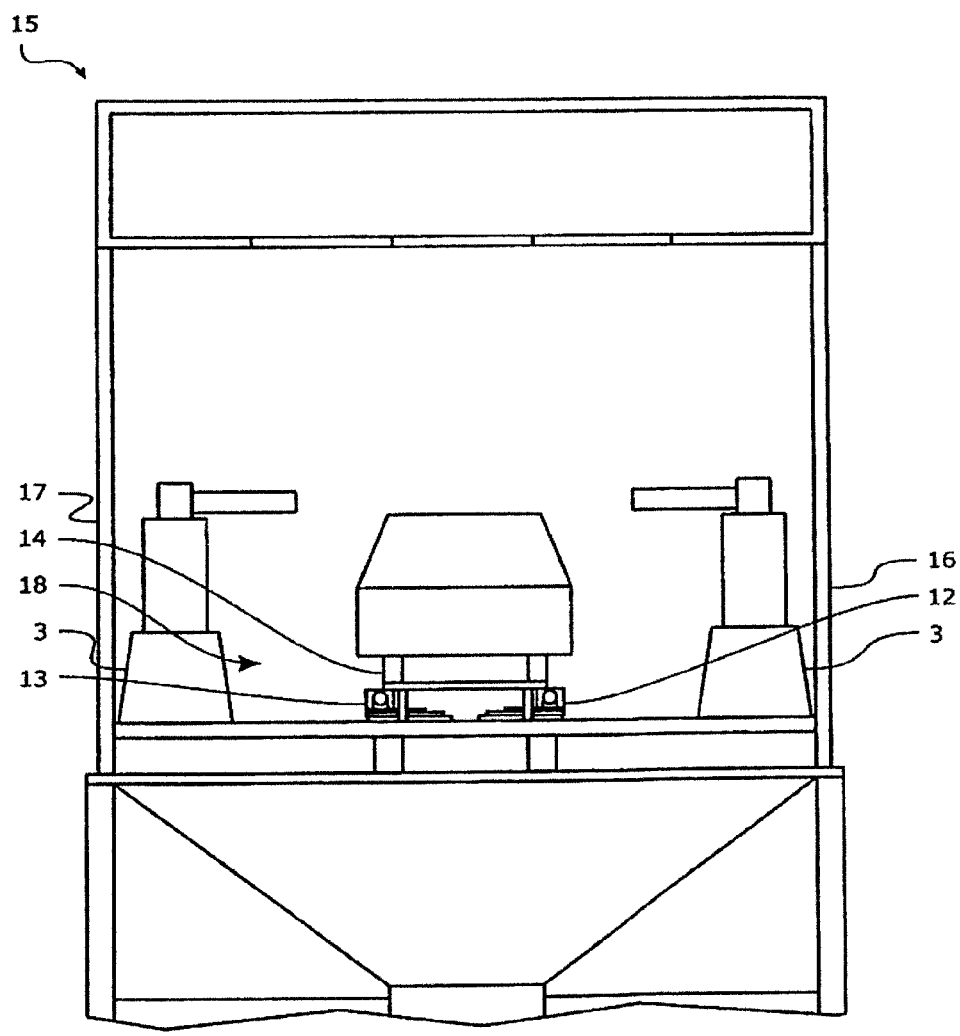
FIG. 10 shows a sectional view of the painting booth of FIG. 9.

FIGS. 9 and 10 show a top view and a sectional view of a situation in which the positioning devices 10-13 are in their respective rest position. This is assumed when the handling robots 120 assigned to the positioning devices 10-13 are momentarily not required, and/or the space otherwise occupied by the positioning devices 10-13 is required, for instance, for a movement of the multi-axis robots 3. In the embodiment which is represented here, this is the case when the changeover is made from an internal painting to an external painting. For the external painting, the body apertures, such as doors or hood/tailgate, should as far as possible be closed. This closing operation is performed by the handling robots 120. After this, the handling robots 120 proceed into their rest setting and the positioning devices 10-11 move into the rest position and thereby give the multi-axis robots 3 a maximum possible space. When positioned in the rest position, the handling robots are disengaged from and disposed beneath the object or body.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

We claim:

1. A device for handling at least one object, comprising:
a painting booth;
a conveying device for moving at least one object to be treated along a conveying axis, the conveying device being positioned within the painting booth;
a handling robot; and
a positioning device for moving the handling robot, the positioning device comprising a pivotable platform, the pivotable platform articulately attached at a first end, beneath the at least one object being treated, to a joint fastened to flooring of the painting booth, and a guide attached to a second end of the platform, the guide to provide pivoting motion of the platform in an angular direction away from or toward the conveying axis, the pivoting motion defining a pivot axis of movement, the platform mechanically coupled to displacement devices to provide for the pivot axis of movement, a mechanical connection facility on the platform for bearing the handling robot, the positioning device movable along the pivot axis between an active position and a rest position,
wherein the handling robot is disengaged from and is disposed beneath the at least one object when the handling robot is in the rest position while the at least one object is being treated by at least one multi-axis robot in the painting booth.

2. The device as claimed in claim 1, wherein the handling robot, in the active position, is configured to be disposed at least partially above a lowest point of the at least one object being treated.

3. The device as claimed in claim 1, wherein the positioning device has a mechanical connection facility for the handling robot, and/or the handling robot is a multi-axis robot.

4. The device as claimed in claim 3, wherein the mechanical connection facility in the rest position is configured to be in a different position than when in the active position.

5. The device as claimed in claim 1, wherein the positioning device is configured such that the changeover from the rest position into the active position is realized by rotational movement and/or translational movement.

6. The device as claimed in claim 1, wherein the positioning device is configured to protect the handling robot when the handling robot is in the rest position.

7. An apparatus for treating the at least one object, comprising:
a painting booth;
at least one multi-axis robot having a coating device for treating at least one object positioned inside the painting booth;
a conveying device for moving the at least one object to be treated along a conveying axis, the conveying device being positioned within the painting booth; and
a device for handling the at least one object to be treated positioned inside the painting booth, the device for handling the at least one object comprising a handling robot and a positioning device for moving the handling robot, the positioning device comprising a pivotable platform, the pivotable platform articulately attached at a first end, beneath the at least one object being treated, to a joint fastened to flooring of the painting booth, and a guide attached to a second end of the platform, the guide to provide pivoting motion of the platform in an angular direction away from or toward the conveying axis, the pivoting motion defining a pivot axis of movement, the platform mechanically coupled to displacement devices to provide for the pivot axis of movement, a mechanical connection facility on the platform for bearing the handling robot, the positioning device movable along the pivot axis between an active position and a rest position, wherein the handling robot is disengaged from and is disposed beneath the at least one object when the handling robot is in the rest position while the at least one object is being treated by at least one multi-axis robot in the painting booth.

8. The apparatus as claimed in claim 7, wherein the apparatus for treating at least one object has at least one multi-axis robot bearing a coating device positioned inside the painting booth.

9. The apparatus as claimed in claim 8, wherein the handling robot is positioned on the positioning device outside a range of movement of the at least one multi-axis robot when the handling robot is in the rest position.

10. The apparatus as claimed in claim 8, comprising a control device for controlling the painting booth, the control device further controlling the positioning device, the at least one multi-axis robot and the handling robot while the handling robot is in the active position so that,
a vehicle body, with open doors, tailgate and/or front hood, is painted from inside, and/or with closed doors, tailgate and/or front hood, is painted from outside, by the at least one multi-axis robot bearing the coating device.

11. The apparatus as claimed in claim 8, comprising a control device for the painting booth, wherein the control device presets operating parameters for the at least one multi-axis robot and coating device, and controls a spray jet from the coating device based upon the state of the moving device and the at least one handling robot.

12. An apparatus for treating at least one object, comprising:
a painting booth;
at least one multi-axis robot having a coating device for treating at least one object positioned inside the painting booth;
a conveying device for moving the at least one object to be treated along a conveying axis, the conveying device being positioned within the painting booth; and
a device for handling the at least one object to be treated positioned inside the painting booth, the device for handling the at least one object comprising a handling robot and a positioning device for moving the handling robot, the positioning device comprising a pivotable platform, the pivotable platform articulately attached at a first end, beneath the at least one object being treated, to a joint fastened to flooring of the painting booth, and a guide attached to a second end of the platform, the guide to provide pivoting motion of the platform in an angular direction away from or toward the conveying axis, the pivoting motion defining a pivot axis of movement, the platform mechanically coupled to displacement devices to provide for the pivot axis of movement, a mechanical connection facility on the platform for bearing the handling robot, the positioning device movable along the pivot axis between an active position and a rest position,
wherein the handling robot is disengaged from and is disposed beneath the at least one object when the handling robot is in the rest position while the at least one object is being treated by at least one multi-axis robot in the painting booth, and
further wherein the positioning device has a mechanical connection facility for the handling robot, and the mechanical connection facility in the rest position is configured to be in a different position than when in the active position.

13. The apparatus as claimed in claim 12, wherein the mechanical connection facility is configured to move along a path at an angle within a range from 30° to 150° to a direction of movement of the at least one object to be treated as moved by the conveying device when moving to the active position.

14. The apparatus as claimed in claim 12, wherein the mechanical connection facility is configured to move along a path at an angle within a range from 45° to 135° to a direction of movement of the at least one object to be treated as moved by the conveying device when moving to the active position.

15. The apparatus as claimed in claim 12, wherein the mechanical connection facility is configured to move along a path at an angle within a range from 60° to 120° to a direction of movement of the at least one object to be treated as moved by the conveying device when moving to the active position.

16. The apparatus as claimed in claim 12, wherein the mechanical connection facility is configured to move along a path at an angle of 90° to a direction of movement of the at least one object to be treated as moved by the conveying device when moving to the active position.

* * * * *